(12) United States Patent
Rhodes

(10) Patent No.: US 7,014,757 B2
(45) Date of Patent: Mar. 21, 2006

(54) INTEGRATED THREE PHASE SEPARATOR

(75) Inventor: James E. Rhodes, Farmington, NM (US)

(73) Assignee: Process Equipment & Service Company, Inc., Farmington, NM (US)

( * ) Notice: Subject to any disclaimer, the term of this patent is extended or adjusted under 35 U.S.C. 154(b) by 1 day.

(21) Appl. No.: 10/685,191

(22) Filed: Oct. 14, 2003

(65) Prior Publication Data

US 2005/0077235 A1    Apr. 14, 2005

(51) Int. Cl.
*B01D 17/025* (2006.01)
(52) U.S. Cl. .................. 210/188; 210/519; 210/521; 210/539; 210/540; 96/182; 96/184
(58) Field of Classification Search ............... 210/188, 210/519, 521, 522, 538, 539, 540, 532.1; 95/182, 183, 184
See application file for complete search history.

(56) References Cited

U.S. PATENT DOCUMENTS

| | | | | |
|---|---|---|---|---|
| 2,613,811 A | * | 10/1952 | Archibald | 210/521 |
| 2,726,729 A | | 12/1955 | Williams | 183/2.7 |
| 3,312,044 A | | 4/1967 | McCarter | 55/168 |
| 3,394,530 A | | 7/1968 | O'Neill et al. | 55/166 |
| 3,443,694 A | * | 5/1969 | Vsevolod Alexandrovich Malinovsky | 210/521 |
| 3,476,678 A | | 11/1969 | Murdock, Sr. | 204/308 |
| 4,132,645 A | * | 1/1979 | Bottomley et al. | 210/540 |
| 4,257,895 A | | 3/1981 | Murdock | 210/243 |
| 4,583,998 A | | 4/1986 | Reid et al. | 55/45 |
| 4,650,579 A | * | 3/1987 | Harvey et al. | 210/522 |
| 4,708,793 A | * | 11/1987 | Cathriner et al. | 210/539 |
| 4,797,262 A | | 1/1989 | Dewitz | 422/142 |
| 4,860,591 A | | 8/1989 | Garland | 73/861 |
| 4,978,373 A | | 12/1990 | Endacott | 55/165 |
| 5,204,000 A | * | 4/1993 | Steadman et al. | 210/539 |
| 5,326,474 A | * | 7/1994 | Adams et al. | 210/521 |
| 5,415,776 A | | 5/1995 | Homan | 210/519 |
| 5,480,547 A | * | 1/1996 | Williamson et al. | 210/540 |
| 5,526,684 A | | 6/1996 | Liu et al. | 73/200 |
| 2002/0162806 A1 | * | 11/2002 | Komistek | 210/539 |

FOREIGN PATENT DOCUMENTS

| | | |
|---|---|---|
| AT | 191811 | * 10/1956 |
| JP | 56-137026 | 10/1981 |
| WO | WO86/03252 | 6/1986 |

* cited by examiner

*Primary Examiner*—Christopher Upton
(74) *Attorney, Agent, or Firm*—Head, Johnson & Kachigian

(57) ABSTRACT

An integrated three phase separator for separation of natural gas, hydrocarbon liquids, and water or brine. The separator includes a cylindrical vertical separation unit having a closed top and an opposed, open bottom. A cylindrical horizontal separation unit has a pair of opposed ends, a first, closed end and a second, open end. A tubular elbow connection includes a pair of ends, one end connected to the open bottom of the vertical separation unit and another end connected to the open end of the horizontal separation unit so that the vertical separation unit and horizontal separation unit are in fluid connection with each other. A metering plate within the tubular elbow connection retains natural gas in the horizontal unit while permitting gentle release of liquid into the horizontal unit.

11 Claims, 2 Drawing Sheets

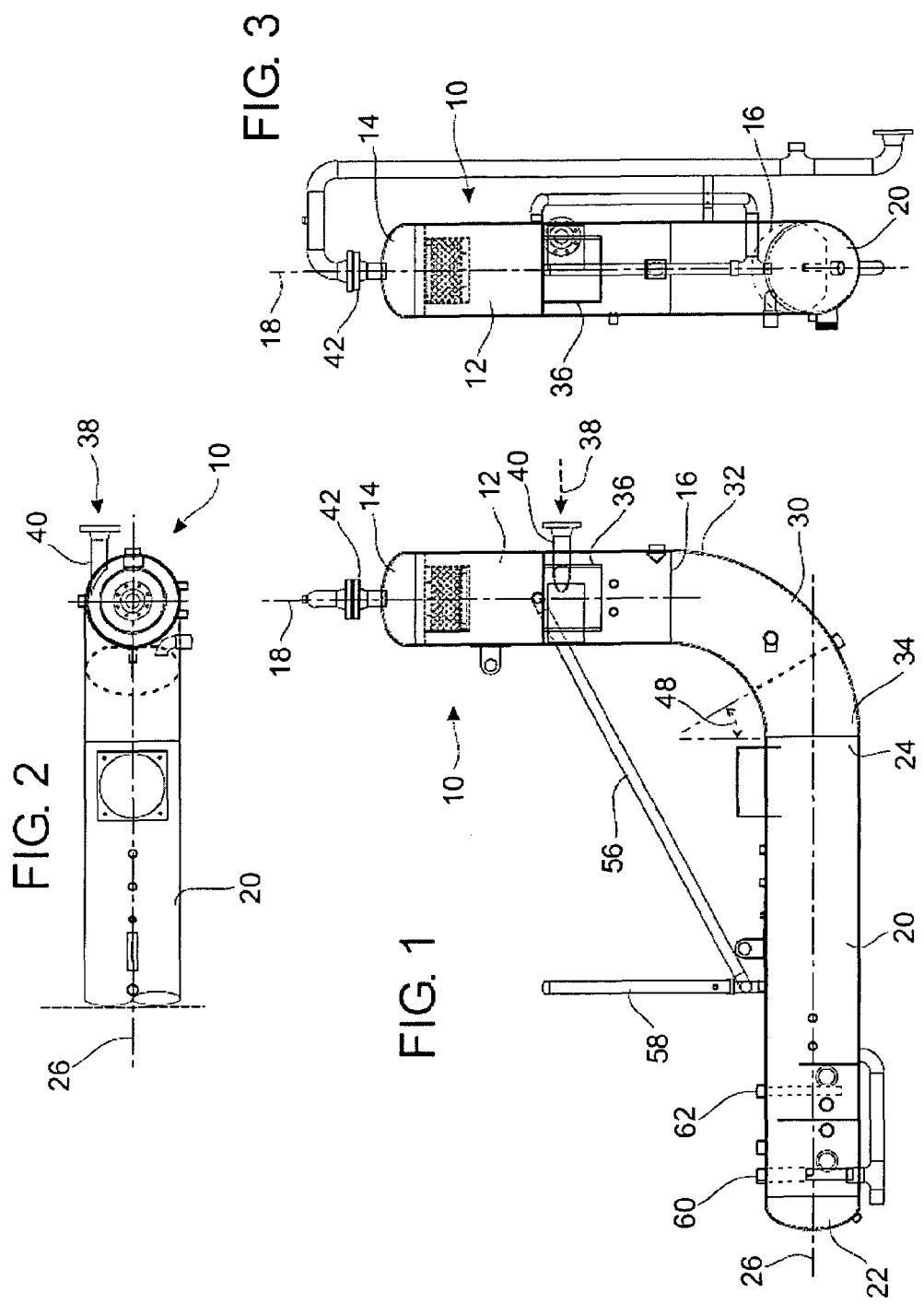

INTEGRATED THREE PHASE SEPARATOR

BACKGROUND OF THE INVENTION

1. Field of the Invention

The present invention relates to an integrated three phase separator having a vertical separation unit integrated with a horizontal separation unit.

2. Prior Art

Subterranean oil and gas which is produced from various types of production areas or stratas are intermixed resulting in an emulsion of hydrocarbon liquid such as oil, natural gas and water or brine. Various types of field processing separators have been used in the past to separate the mixture coming from a well head into its constituents of natural gas, hydrocarbon liquid such as oil, and water or brine.

Different types of separator vessels have been used in the past. Horizontal, cylindrical vessels typically have more gas capacity than vertical vessels of the same diameter. Vertical cylindrical vessels have also been used. In general, vertical vessels handle liquid slugs better than horizontal vessels.

In some cases, vessels in the prior art have attempted to utilize features of both horizontal and vertical vessels.

For example, Williams (U.S. Pat. No. 2,726,729) discloses a horizontal drum having vertical partitions within a three-phase horizontal separator with upright separator sections.

McCarter (U.S. Pat. No. 3,312,044) discloses a horizontal separator with an attached vertical section.

O'Neill et al. (U.S. Pat. No. 3,394,530) discloses a horizontal separator with a vertical section near one end of the horizontal section.

It is known that as a natural gas well ages, the gas pressure tends to be reduced. For example, wells that originally had bottom hole pressures of 1500 to 2500 psi might later have pressures of 200 psi. In some field operations, where the pressure has decreased over time, artificial lift devices and procedures are used to bring the natural gas and liquid hydrocarbons to the surface. This can result in periodic slugs of liquid entering the separator. Since the separator operates by gravity, periodic slugs or surges of liquid into the separator vessel are counterproductive to the separation process.

Accordingly, there is a need to provide a separator having both a horizontal cylindrical vessel and a vertical cylindrical vessel which are integrated into a single unit and which are easy to construct and manufacture.

There remains a need for an integrated horizontal and vertical separator which includes a mechanism to hold periodic surges of liquid in the vertical vessel and gently release them into the horizontal vessel.

There is additionally a need for an integrated horizontal and vertical separation unit which provides an equalizer/condenser mechanism between the gas areas of the vertical unit and the horizontal unit.

SUMMARY OF THE INVENTION

The present invention is directed to an integrated three phase separator for separation of natural gas, hydrocarbon liquids such as oil, and water or brine. The separator includes a cylindrical, vertical separation vessel or unit having a closed top and an open bottom.

The three phase separator also includes a cylindrical horizontal vessel or unit. The horizontal unit includes a pair of opposed ends, a first, closed end, and a second, open end.

Juxtaposed between the open bottom end of the vertical vessel and the open end of the horizontal cylindrical vessel is a tubular elbow connection. The tubular elbow connection has one open end connected to the opened bottom of the vertical unit and another, opposed end connected to the opened end of the horizontal unit. Since the tubular elbow connection is in the form of a 90° angle, the axis of the vertical unit is perpendicular to the axis of the horizontal unit.

The vertical separation unit has a diameter equal to the diameter of an open end of the tubular elbow connection. Likewise, the horizontal separation unit has a diameter equal to the diameter of an open end of the tubular elbow connection. Accordingly, fabrication of the separator into a single integrated device is straight forward and uncomplicated.

Fluid from a well head enters the vertical tank through a fluid inlet which is tangential to the vertical vessel and assists in creating a cyclonic or circular flow therein. A gas outlet at or near the top of the vertical vessel is used to remove and deliver natural gas from the separator. Liquid in the vertical vessel settles and migrates toward the open base of the vertical vessel and thereafter into the tubular elbow connection. Within the tubular elbow connection is a metering plate which partially extends across the tubular elbow connection to retain natural gas in the horizontal unit while permitting gradual entry of liquid from the vertical vessel and tubular elbow connection into the horizontal vessel.

In one preferred embodiment of the invention, the metering plate is juxtaposed at an angle to the axis of the vertical vessel and at an angle to the axis of the horizontal vessel. The metering plate does not extend all the way across the tubular elbow connection but has a truncated base. Accordingly, while natural gas in the horizontal vessel will be retained in the horizontal unit, a truncated base and slot permit liquid from the vertical unit and from the tubular elbow connection to pass gently into the horizontal vessel.

In order to equalize the pressure in the two vessels, an equalizer/condenser line extends between an upper portion of the vertical vessel and an upper portion of the horizontal vessel. In the event that condensation takes place, liquid droplets will fall out and flow in the equalizer/condenser line and move by gravity back into the horizontal vessel.

BRIEF DESCRIPTION OF THE DRAWINGS

FIG. 1 is a side view,

FIG. 2 is a top view, and

FIG. 3 is an end view of an integrated three phase separator constructed in accordance with the present invention;

DETAILED DESCRIPTION OF THE PREFERRED EMBODIMENTS

Figure 4:
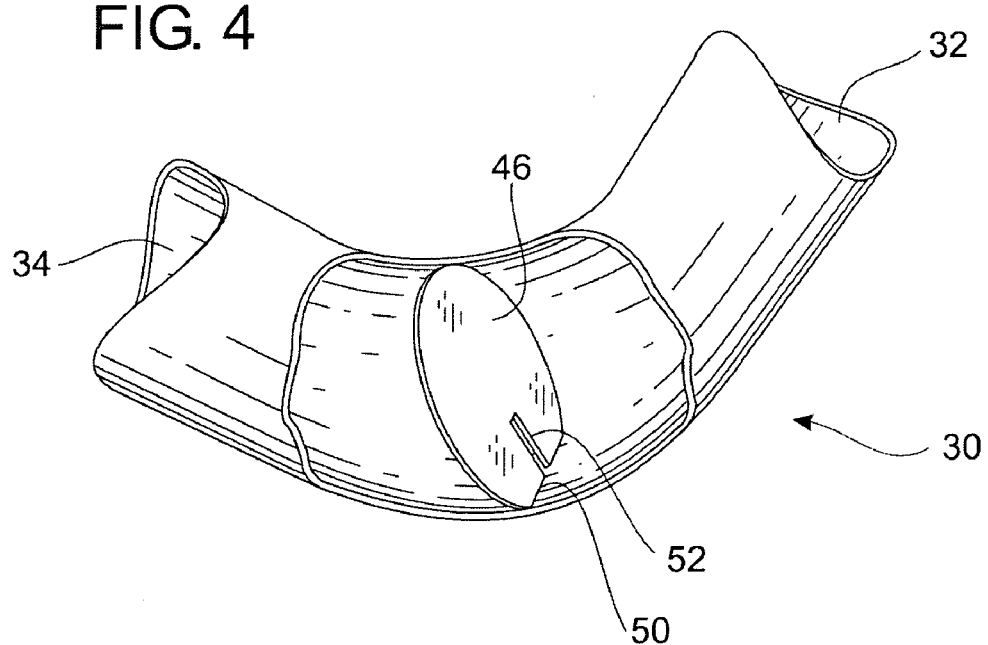
FIG. 4 is a tubular elbow connection of the integrated three phase separator shown in FIG. 1 apart from the device for ease of viewing.

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Referring to the drawings in detail, FIG. 1 illustrates a side view, FIG. 2 is a top view, and FIG. 3 is an end view of an integrated three phase separator 10 for separation of natural gas, hydrocarbon liquid such as oil, and water or brine. The separator 10 includes a cylindrical, vertical separation vessel or unit 12 having a closed top 14 and an open bottom 16. The cylindrical, vertical separation unit 12 has an axis 18 illustrated by dashed lines.

The three phase separator 10 also includes a cylindrical horizontal vessel or unit 20. The horizontal unit 20 includes a pair of opposed ends, a first, closed end 22 and a second, open end 24. The horizontal unit has an axis 26 illustrated by dashed lines. The horizontal unit may be enclosed or surrounded in a water heater bath (not shown). Heating assists in the liquid separation process. The horizontal unit 20 may also include a water outlet 60 and an oil outlet 62, all as are well known.

Juxtaposed between the open bottom end 16 of the vertical vessel 12 and the open end 24 of the horizontal cylindrical vessel 20 is a tubular elbow connection 30. The tubular elbow connection 30 has one open end 32 connected to the open bottom 16 of the vertical separation unit and another, opposed end 34 connected to the open end 24 of the horizontal unit 20. The tubular elbow connection 30 is in the form of a 90° angle. Accordingly, the axis of the vertical unit 12 is perpendicular to the axis of the horizontal unit 20.

The open end 32 of the tubular elbow connection has a diameter equal to the open bottom 16 of the vertical separation unit while the opposed end 34 of the tubular elbow connection has a diameter equal to the open end 24 of the horizontal unit. Accordingly, fabrication of the three elements into a single integrated unit is straight forward and uncomplicated. A single circumferential weld joins the vertical unit to the tubular elbow connection and a single circumferential weld joins the tubular connection to the horizontal unit.

Fluid from a well head (not shown) enters the vertical unit 12 as shown by arrow 38. The fluid enters through a fluid inlet 40 which is tangential to the vertical vessel and assists in creating a cyclonic or circular flow therein. A reduced diameter cylinder 36 within the vertical vessel acts as a cyclonic diverter and promotes the cyclonic flow. Natural gas tends to migrate and remain at or near the closed top 14 of the vertical vessel 12. A gas outlet 42 at the top of the vessel is used to remove and deliver natural gas from the separator.

Liquid in the vertical vessel 12 tends to settle and migrate toward the open base 16 of the vertical vessel and thereafter into the tubular elbow connection 30.

Figure 5:
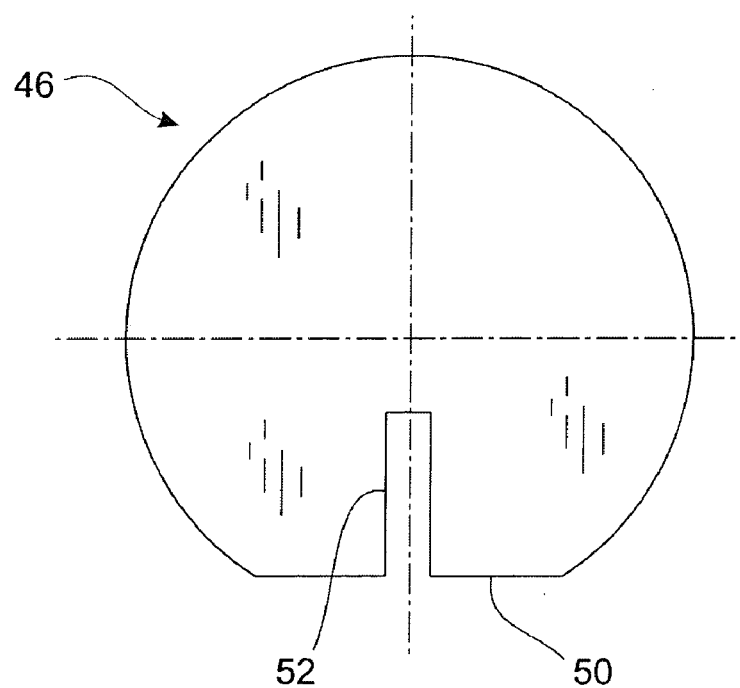
FIG. 5 is a metering plate of the three phase separator apart from the device for ease of viewing.

FIG. 4 illustrates a perspective view of a tubular elbow connection 30 apart from the three phase separator 10 and having portions cut away for ease of viewing. Within the tubular elbow connection 30 is a mechanism to retain natural gas in the horizontal unit 20 while permitting gradual entry of liquid from the vertical vessel 12 and tubular elbow connection 30 into the horizontal vessel. A flat metering plate 46 partially extends across the tubular elbow connection 30. The metering plate 46 is shown apart from the separator in FIG. 5.

As best seen in FIG. 1, in one preferred embodiment, the metering plate 46 is juxtaposed at an angle to the axis of the vertical vessel 12 and at an angle to the axis of the horizontal vessel 20. As depicted by the arrow 48 in FIG. 1, the metering plate is at approximately a 30° angle to the axis of the vertical separation unit. Conversely, the metering plate is at approximately a 60° angle to the axis of the horizontal unit.

It will be understood that the metering plate may be positioned at various chosen angles within the spirit and scope the invention.

The metering plate 46 does not extend all of the way to the base of the tubular elbow connection 30 but has a truncated base. Accordingly, while natural gas in the horizontal vessel will be retained in the horizontal unit, a truncated base 50 and slot 52 permit liquid from the vertical unit and the tubular elbow connection 30 to pass gently into the horizontal vessel. If the vertical vessel is subject to periodic surges of liquid, the metering plate will gently release liquid to the horizontal vessel.

In order to equalize the pressure in the two vessels, an equalizer/condenser line 56 extends between an upper portion of the vertical vessel and an upper portion of the horizontal vessel. An equalizer/condenser fluid line 56 extends in angular relationship to the axis of the vertical vessel and in angular relationship to the axis of the horizontal vessel.

To the extent that natural gas from the horizontal vessel enters the equalizer/condenser fluid line 56, it may be cooled depending on the ambient temperature. During cooling, in the event that condensation takes place, liquid droplets will fall out and flow in the equalizer/condenser line 56 and move by gravity back into the horizontal vessel.

The water bath heater mentioned above uses natural gas as a fuel source. Additionally, natural gas is used as instrument gas for certain pneumatic controls (not shown). Extending from the equalizer/condenser line 56 is a supply gas dryer line 58 so that natural gas may be used as fuel for the water bath heater and as instrument gas for the pneumatic controls.

In summary, the separator 10 requires a constant supply of fuel gas and this gas comes from the inlet gas dome, via the equalizer/condenser line and the gas dryer. During cold weather this fuel gas is cooled due to heat transfer with the surrounding air. This cooling causes the transitional vapors to condense into liquid, and they drain into the horizontal separator. Likewise, any transitional vapors that try to leave the horizontal separator are cooled and the resulting liquid also drains back into the horizontal separator.

Whereas, the present invention has been described in relation to the drawings attached hereto, it should be understood that other and further modifications, apart from those shown or suggested herein, may be made within the spirit and scope of this invention.

What is claimed is:

1. An integrated three phase separator for separation of natural gas, hydrocarbon liquid, and water or brine, which separator comprises:

a cylindrical vertical separation unit having a substantially closed top, an opposed bottom, a fluid inlet and a gas outlet;

a cylindrical horizontal separation unit having a first substantially closed end and a second end, a water or brine outlet and a hydrocarbon liquid outlet;

a tubular elbow connection having a pair of ends, one said end connected to said bottom of said vertical separation unit and another said end connected at said second end of said horizontal separation unit; and metering plate means within said tubular elbow connection to retain said natural gas in said horizontal unit.

2. An integrated three phase separator as set forth in claim 1 wherein said vertical separation unit, said horizontal separation unit, and said tubular elbow connection each have the same diameter.

3. An integrated three phase separator as set forth in claim 1 wherein said metering plate means includes a flat plate juxtaposed at an angle to an axis of said vertical separation unit and at an angle to an axis of said horizontal unit.

4. An integrated three phase separator as set forth in claim 3 wherein said flat plate is juxtaposed at approximately a 30° angle to said vertical unit.

5. An integrated three phase separator as set forth in claim 1 wherein said metering plate means includes a flat plate extending across a diameter of said tubular elbow connection, and having a truncated base to permit liquid flow therethrough.

6. An integrated three phase separator as set forth in claim 5 including a slot in said metering plate.

7. An integrated three phase separator as set forth in claim 1 including a fluid inlet from a well head into said vertical separation unit.

8. An integrated three phase separator as set forth in claim 7 wherein said fluid inlet is tangential to said vertical unit.

9. An integrated three phase separator as set forth in claim 1 including a natural gas outlet from said top of said vertical separation unit.

10. An integrated three phase separator as set forth in claim 1 including an equalizer/condenser line extending between said horizontal unit and said vertical unit to balance gas pressure in said units.

11. An integrated three phase separator as set forth in claim 10 including a supply gas dryer line extending from said equalizer/condenser line.

* * * * *